Oct. 10, 1950      H. FLETCHER, JR      2,525,121

APPARATUS FOR MAKING DISPLAY FILM

Filed May 9, 1946      3 Sheets-Sheet 1

*INVENTOR.*
HORACE FLETCHER, JR.
BY
Norman N. Popper *Attorney*

Patented Oct. 10, 1950

2,525,121

UNITED STATES PATENT OFFICE 2,525,121

APPARATUS FOR MAKING DISPLAY FILM

Horace Fletcher, Jr., Lyndhurst Township, Bergen County, N. J.

Application May 9, 1946, Serial No. 668,631

4 Claims. (Cl. 154—1.76)

My invention relates to a new article of manufacture in the nature of a film of distinctive appearance or a display film. Heretofore laminated paper has been produced having interposed within the laminations, fibrous and similar material serving to strengthen the paper.

By the practice of my invention, it is proposed to produce a wholly or partly transparent laminated film that may be made distinctive in appearance so that it will be identified with a product or source, and it is also proposed to produce such material which will have a pleasing and distinctive appearance. It is not the primary intention of this invention that the composite film produced shall have adhesive properties, but it may be endowed in that way.

It is a purpose of this invention to associate display material with a laminated, flexible, transparent sheet. This display material is to be arranged in accordance with definite preconceived esthetic designs. The material selected may be plain or colored thread, plain or colored ribbon or any continuous strip of material such as paper or wire. The product to be created will be a laminated, wholly or partly transparent, flexible film having interposed in the laminations display material arranged according to predetermined patterns.

By the selection of distinctive colored display material and the arrangement of that material in accordance with a certain pattern, a continuous film is produced which is adapted to wrapping products; the design of the display material in the film may become identified with a certain manufacturer and his product.

Such packaging film would have wide application in creating eye-appeal in the products to which it is applied as a covering, and will also serve to identify the maker. It will give the appearance, if created with closely laid fibers, of a fabric covering, yet it need have no interweaving of the display material, such material being fixed in place in the laminations by the adhesive property of the bonding material applied to the film.

Many striking combinations may be created through varying the display material used, through varying the color of the outer film, through varying the color and type of the inner film, e. g., the inner film may be transparent or translucent, white or colored. If the inner film is translucent, a background is provided for the display materials; if the inner film is transparent and uncolored, the article covered supplies the background; but if the inner film is colored and translucent, color is imparted to the article wrapped and a colored background is supplied for the display material.

Not only is a new packaging film supplied, but the product may be utilized in a thousand ways: wallpaper, shower curtains, draperies, bedspreads, portieres, displays, garment storage bags, folders, theater drops, slip-covers, raincoats, window shades, etc.

I intend the appurtenant drawings only to be illustrative of a preferred embodiment of my invention, as many changes may be made within the scope of the hereinafter set forth claims without departing from the spirit of the invention.

Figure 1 presents a schematic lay-out of the apparatus for producing the film.

Figure 6:
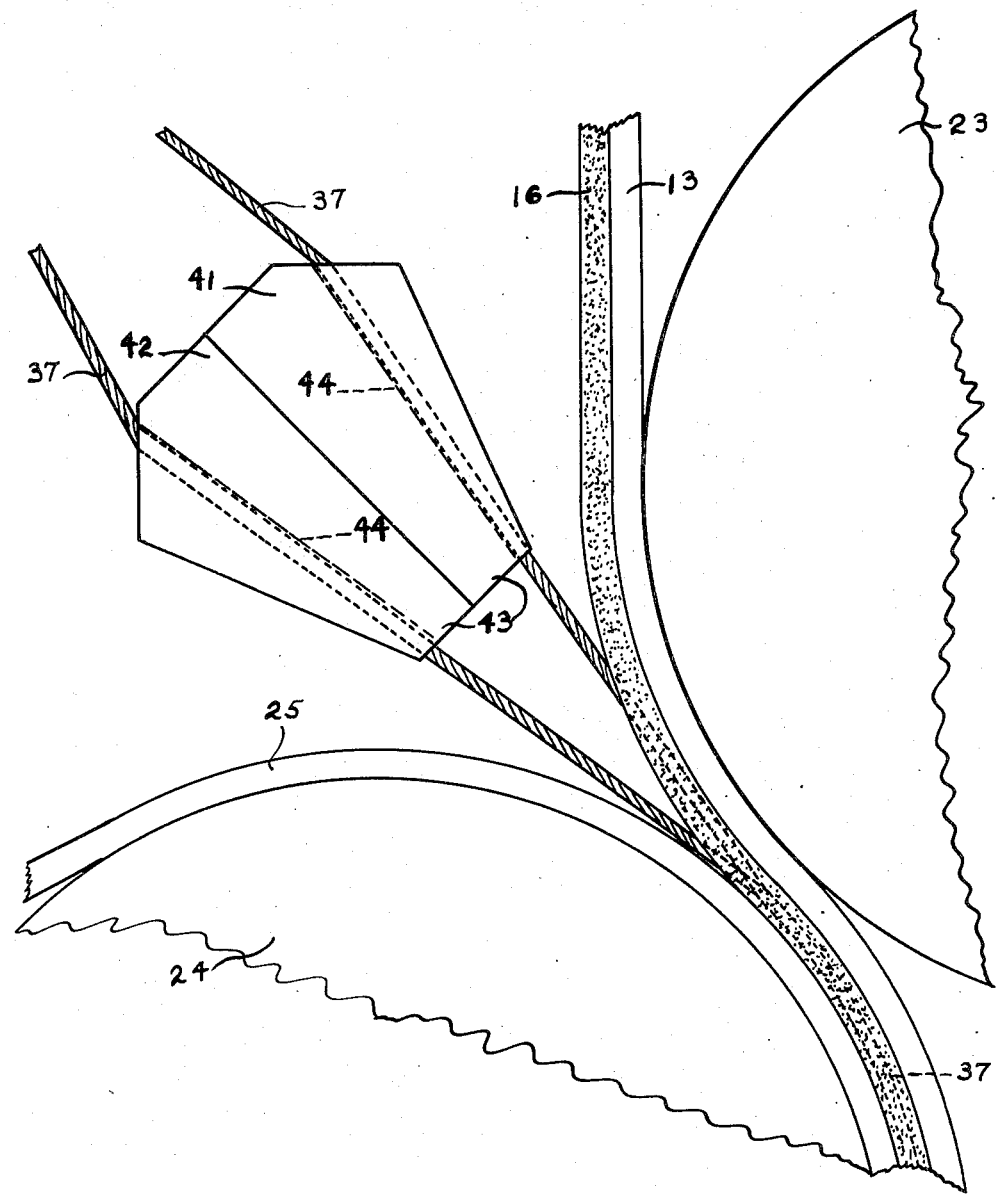

Figure 6 presents a schematic view of modified feed bars and their relation to the laminating rollers.

Referring now to the drawings in detail, a roll 12 of transparent film 13 of cellulose acetate is unrolled and passes over the guide roller 14. There are many types of film that may be used. The preferred type is cellulose acetate, but any type, e. g., cellophane, Pliofilm, paper, or glassine, which has a relatively high tensile strength, has a low absorptive factor, is clear, flexible and transparent may be used. Thickness of the film may vary from .005" to .010".

The film 13 progresses to a coating roller 15. This roller 15 dips into a bath of adhesive material 16 contained in a tank 17 where it is maintained at a temperature of approximately 20° C. The film 13 acquires a coating of adhesive 16 on one side. A doctor-bar 11 limits the amount of adhesive carried by the coating roller 15.

The adhesive is preferably a plasticizer-modified synthetic resin although many other types of adhesives may be used. Any of the several vinyl polymers, glyceryl phthalates, sulphonamid-formaldehyde resins, or phenol-formaldehyde have been found to be satisfactory. The adhesive is dissolved in a suitable coal tar hydrocarbon, such as toluene, benzene and the like, or an alcohol, ester, ketone or petroleum solvent may be used. The plasticizer is preferably di-butyl-phthalate, although many other plasticizers may be used, e. g., glycolate esters. The relationship of the resin and plasticizer may vary within these limits: resin 50–95%, plasticizer 50–5%. The relationship of the resin and the plasticizer to the solvent may vary within these limits: resin and plasticizer 20–60%, solvent 80–40%.

Any of the solvents mentioned is compatible with any of the resins mentioned and each resin is to be used with a plasticizer. Since this art is well known, applicant deems it unnecessary to state the technique in detail.

It is found satisfactory to operate the apparatus so that the film is coated at the rate of 20 feet per minute, but much greater speeds may be adopted with due precautions for the harmless discharge of accumulated charges of static electricity.

The film 13 now passes over the guide rollers 18, 20 and passes into a chamber 19 where a constant flow of heated air at 50° C. assists the evaporation of the solvent as the film 13 progresses over a series of roller transports 21, 21, 21. Air is blown into the chamber 19 by the fan 45 and is heated by the resistance wire 46, or other suitable means.

The adhesive coating 16 becomes thoroughly attached to the film 13 and its immediate adhesive properties become greatly reduced as the solvent is evaporated. The coating 16 passes from a semi-fluid state to a relatively solid state with greatly reduced tackiness. The tackiness may be later increased by the application of heat, without the adhesive coating 16 again being reduced to a semi-fluid state because the solvent is almost completely evaporated.

After emerging from the chamber 19 the film 13 passes over another guide roller 22 and then it passes between the opposed rollers 23, 24. Roller 23 is preferably metallic and its temperature is maintained at approximately 130° C., while roller 24 is preferably of rubber.

A roll of backing strip 25 is fed over the guide roller 38 and between the opposed rollers 23, 24. This backing strip 25 is brought into close contact with the coating of the adhesive 16 applied to the film 13 and the film 13 and the backing strip 25 are intimately bonded together through the application of heat and pressure. The pressure applied may be approximately 250–500 pounds per square inch.

The backing strip 25 may be a film identical in composition with the film 13 or it may be a translucent or colored film or paper.

Display material is introduced into the laminations through the use of a rack 27 positioned adjacent to the opposed rollers 23, 24. This rack 27 contains a series of appropriately arranged spindles 28, 28, 28, etc. A plurality of spools 26 of thread 37 are arranged on the spindles. The thread passes over the guide bar 29 and then passes through slots 30 in the feed bars 31, 32. The feed bars 31, 32 are connected by arms 33, 34 to the bar 35 which is actuated by the reciprocating rod 36.

Figures 2, 4:
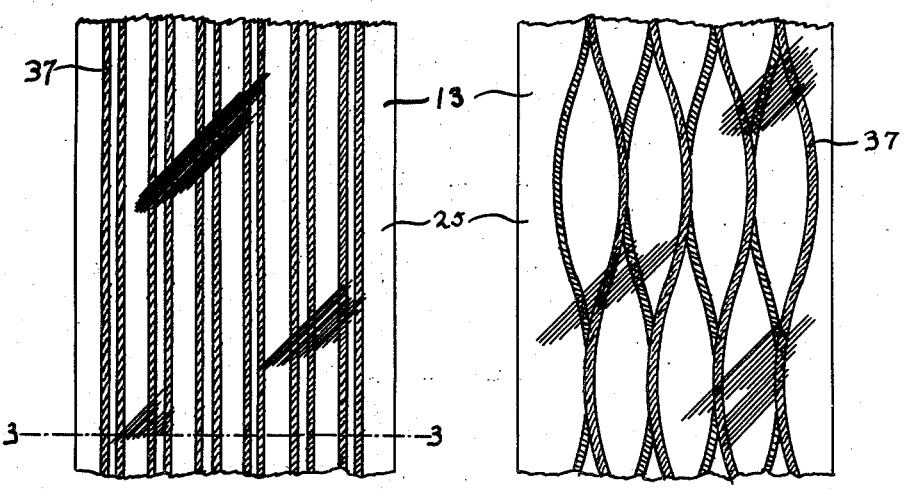
Figure 2 is an example of the type of film produced when the guide bars are static.
Figure 4 is an example of the type of film produced when the guide bars reciprocate relative to each other.
Figure 3:
Figure 3 is a cross-section of the film, taken on the line 3—3 in Figure 2.

Either or both bars 31, 32 may be disconnected from the bar 35 thereby producing a fixed point of feed and laying down the thread 37 in a straight line. Or one of the feed bars 31 or 32 may be actuated to lay down the display material or thread 37 in a pattern depending upon the periodicity of movement; meanwhile, the other bar feeds the thread 37 straight. And if both of the bars 31, 32 are simultaneously actuated, the display material will be held down in a pattern varying from a straight line, as indicated in Figure 4.

At the outset, the ends of the thread 37 are attached to an adhesive strip whereby they and the strip may be simultaneously fed into the laminations to start the thread 37 moving. Obviously by selection of varicolored threads many pleasing and distinctive patterns may be created. And by varying the periodicity of the movement of the feed bars 31, 32, an endless variety of patterns may be created.

Immediately after the thread 37 sets into the laminations, it becomes firmly attached to the adhesive coating. Through the various positions from which it is fed, multiple designs are produced.

By increasing the distance between the spindles 28, rolls of ribbon, paper or tape may be accommodated and fed to the feed bars. The slots 30, 30 will have to be widened to accommodate the greater width of the ribbon, paper or tape, but the tape, ribbon or paper is fed into the laminations in the same way.

The laminated product is then led out over the guide roller 40 and wound on the spool 39.

Figure 1:
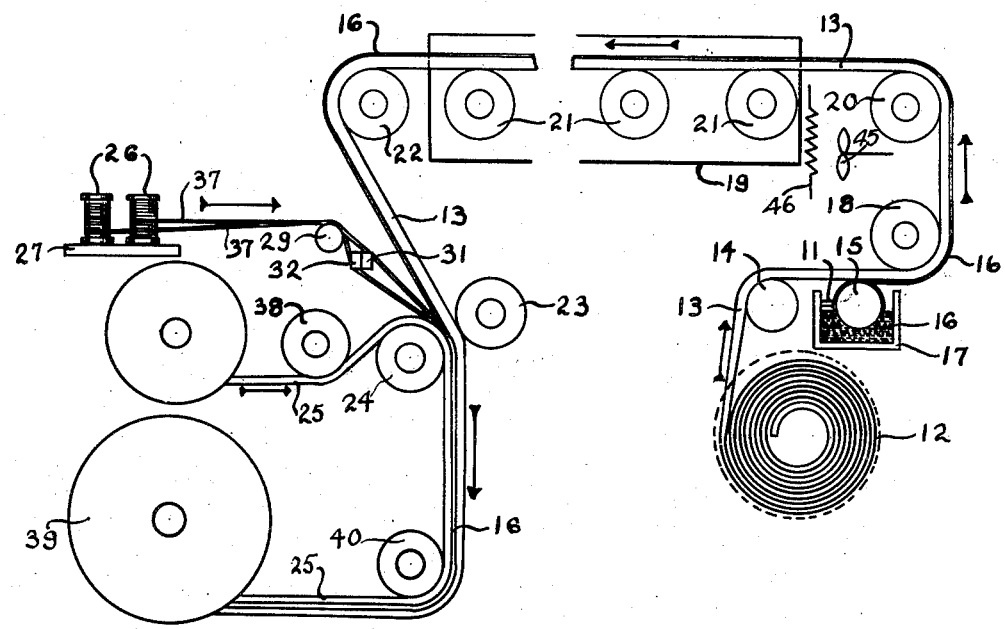
Figure 5:
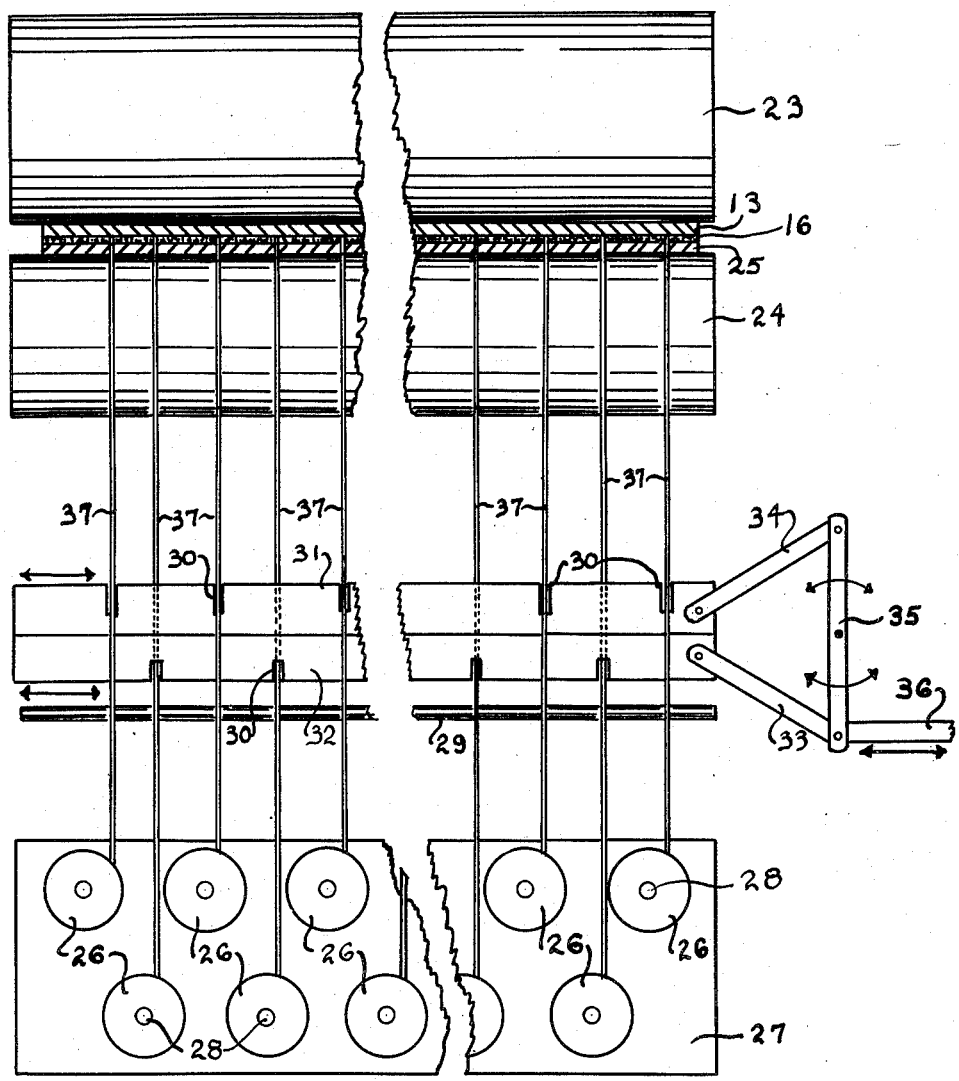
Figure 5 is a top view of the feed apparatus showing the introduction of display material into the laminations, the film itself having been cut away at the exact point of lamination.

The feed bars 31, 32 as shown in Figures 1 and 5 are rectangular. However, in view of the desirability to lay down the thread 37 in close proximity to the point of lamination, Figure 6 indicates modified feed bars 41, 42 which may be each pentagonal in cross-section. The narrow ends 43 may be closely approached to the point of lamination. These pentagonal feed bars 41, 42 will also be provided with slots 44 through which the thread 37 passes.

It will be seen that I have provided a machine, which, by the practice of the method referred to, produces an article of manufacture that may be used for a great variety of purposes. It is inexpensive, attractive, and susceptible to manufacture in an almost unlimited number of forms. It may simulate a woven fabric in appearance, although there is no interweaving of the display material.

The foregoing description is intended merely to be illustrative of a preferred form of my invention, for many changes may be made within the scope of the hereinafter appended claims, without departing from the spirit of the invention.

I claim:

1. A laminating machine comprising means for coating a film, a means for drying the coating on the film, opposed rollers engaged with each other whereby films introduced between the rollers are laminated, a display material feed bar disposed in close relationship to the point of engagement between the rollers, slots in the feed bar angularly disposed and directed toward the point of engagement between the rollers whereby display material may be introduced through the slots between films being laminated by the rollers.

2. A laminating machine comprising means for coating a film, a means for drying the coating on the film, opposed rollers engaged with each other whereby films introduced between the rollers are laminated, a display material feed bar having a tapered end disposed in close relationship to the point of engagement between the rollers, slots in the feed bar angularly disposed and directed toward the point of engagement between the rollers whereby display material may be introduced through the slots between films being laminated by the rollers.

3. A laminating machine comprising means for coating a film, a means for drying the coating on the film, opposed rollers engaged with each other whereby films introduced between the rollers are laminated, display material feed bars having a tapered end disposed in close relationship to the point of engagement between the rollers, slots in the feed bars angularly disposed and directed toward the point of engagement between the rollers whereby display material may be introduced through the slots between films being laminated by the rollers.

4. A laminating machine comprising means for coating a film, a means for drying the coating on the film, opposed rollers engaged with each other whereby films introduced between the rollers are laminated, display material feed bars having a tapered end disposed in close relationship to the point of engagement between the rollers, slots in the feed bars angularly disposed and directed toward the point of engagement between the rollers whereby display material may be introduced through the slots between films being laminated by the rollers and a means for reciprocating the feed bars.

HORACE FLETCHER, Jr.

REFERENCES CITED

The following references are of record in the file of this patent:

UNITED STATES PATENTS

| Number | Name | Date |
| --- | --- | --- |
| 197,502 | Turner et al. | Nov. 27, 1877 |
| 1,266,766 | Brandenberger | May 21, 1918 |
| 1,590,167 | Howard | June 22, 1926 |
| 1,797,998 | Sadtler | Mar. 24, 1931 |
| 1,905,392 | Freydberg | Apr. 25, 1933 |
| 2,040,608 | Hinrichs | May 12, 1936 |
| 2,071,926 | Geerlings | Feb. 23, 1937 |
| 2,101,876 | Scott | Dec. 14, 1937 |
| 2,166,819 | Miller | July 18, 1939 |
| 2,171,259 | Scott | Aug. 29, 1939 |
| 2,248,617 | Feeley et al. | July 8, 1941 |
| 2,273,677 | Wallach | Feb. 17, 1942 |

Certificate of Correction

Patent No. 2,525,121                                                October 10, 1950

HORACE FLETCHER, Jr.

It is hereby certified that error appears in the printed specification of the above numbered patent requiring correction as follows:

Column 2, line 40, for ".005'''" read *.0005"*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*